United States Patent [19]
Chen

[11] Patent Number: 6,048,035
[45] Date of Patent: Apr. 11, 2000

[54] BICYCLE WHEEL RIM

[75] Inventor: Chao-Ying Chen, Tainan Hsien, Taiwan

[73] Assignee: Alex Machine Industrial Co., Ltd., Tainan Hsien, Taiwan

[21] Appl. No.: 09/198,065

[22] Filed: Nov. 23, 1998

[51] Int. Cl.[7] ..................................................... B60B 21/00
[52] U.S. Cl. .................................. 301/30; 301/58; 301/95
[58] Field of Search .................................. 301/30, 31, 32, 301/33, 95, 96, 97, 98

[56] References Cited

U.S. PATENT DOCUMENTS

| | | | |
|---|---|---|---|
| 1,649,945 | 11/1927 | Booth | 301/31 X |
| 5,653,510 | 8/1997 | Osborne | 301/95 |
| 5,941,606 | 8/1999 | Chen | 301/30 |

FOREIGN PATENT DOCUMENTS

| | | | |
|---|---|---|---|
| 786032 | 8/1935 | France | 301/58 |
| 356 708 | 11/1936 | Italy | 301/58 |

*Primary Examiner*—Russell D. Stormer
*Attorney, Agent, or Firm*—Townsend and Townsend and Crew LLP

[57] ABSTRACT

A bicycle wheel rim includes an annular frame formed from a metal strip with opposite end portions and having spaced left and right annular tire retaining walls with brake pad contacting surfaces, an annular inner spoke mounting wall interconnecting inner edges of the tire retaining walls, and an annular outer connecting wall disposed around the spoke mounting wall and interconnecting the tire retaining walls. The tire retaining walls, the spoke mounting wall and the outer connecting wall cooperatively confine an annular channel. Each of the left and right annular tire retaining walls, the spoke mounting wall and the outer connecting wall has two confronting end faces that are disposed respectively at the end portions of the metal strip and that are in close contact with each other. A connecting member is fitted in the channel and extends into the end portions of the metal strip. A weld connection is provided on the annular frame to strengthen connection between the end portions of the metal strip. The brake pad contacting surfaces of the tire retaining walls are free of any weld flash.

8 Claims, 8 Drawing Sheets

BICYCLE WHEEL RIM

BACKGROUND OF THE INVENTION

1. Field of the Invention

This invention relates to a bicycle wheel rim, more particularly to a bicycle wheel rim which is provided with a weld connection and which has two opposite brake pad contacting surfaces that are free of any weld flash.

2. Description of the Related Art

A conventional bicycle wheel rim is generally produced by forming a metal strip, such as from extruded aluminum, cutting and bending the metal strip to form an annular shape with a predetermined size, and bonding two opposite end portions of the metal strip by flash-welding to form an annular frame. When electric current flows through the opposite end portions of the metal strip during the flash-welding process, a layer of molten metal is formed between the end portions of the metal strip to bond together the same. However, since weld flash produced during the flash-welding process would unavoidably extend to two brake pad contacting surfaces of the annular frame, the brake pad contacting surfaces must be polished after the flash-welding process. Moreover, the end portions of the metal strip become brittle after the flash-welding process.

To solve the aforementioned drawbacks, it has been proposed heretofore to provide a connecting member for interconnecting the end portions of the metal strip. Referring to FIGS. 1 and 2, a conventional bicycle wheel rim 1 is shown to include an annular frame 11 and a connecting member 10. The annular frame 11 is formed from an aluminum metal strip with two opposite end portions, and includes two spaced annular tire retaining walls 12 which have inner edges proximate to a central axis of the annular frame 11 and two opposite brake pad contacting surfaces 121, an annular inner spoke mounting wall 13 interconnecting the inner edges of the tire retaining walls 12, and an annular outer connecting wall 14 disposed around the spoke mounting wall 13 and interconnecting the tire retaining walls 12. The tire retaining walls 12, the inner spoke mounting wall 13 and the outer connecting wall 14 cooperatively confine an annular channel 15. The connecting member 10 has a cross-section corresponding to that of the annular channel 15. After applying an adhesive on the outer surface of the connecting member 10, the connecting member 10 is fitted in the annular channel 15 so as to extend into the end portions of the annular frame 11 for bonding together the end portions of the annular frame 11.

With the use of the connecting member 10 to adhesively connect the end portions of the metal strip for bonding together the end portions, a flash-welding process and a succeeding polishing step can be obviated. However, when the bicycle wheel rim is subjected to an electroplating process after assembly thereof, the adhesive is likely to degrade and generate an undesired gas under the high temperature environment of the electroplating process, thereby adversely affecting the strength of the connection between the end portions of the metal strip.

Referring again to FIGS. 1 and 2, the bicycle wheel rim 1 is mounted on a bicycle hub 19 by means of a plurality of spokes 17. To mount the spokes 17 on the bicycle wheel rim 1, the inner spoke mounting wall 13 is formed with a plurality of inner spoke mounting holes 131, while the outer connecting wall 14 is formed with a plurality of outer spoke mounting holes 141 that are registered with the inner spoke mounting holes 131, respectively. Each of the outer spoke mounting holes 141 permits extension of a spoke fastener 18 of a respective one of the spokes 17 therethrough, and is larger than the corresponding inner spoke mounting hole 131 so that the spoke fastener 18 abuts against a rim portion of the corresponding inner spoke mounting hole 131. In design, it is desirable to make the connecting member 10 longer, usually longer than the distance between adjacent pairs of the inner spoke mounting holes 131 (or the outer spoke mounting holes 141) to increase the bonding strength between the end portions of the metal strip. As such, the connecting member 10 should be formed with through holes that are aligned with the corresponding inner and outer spoke mounting holes 131, 141 to permit extension of at least one spoke 17' therethrough. As shown in FIG. 3, when the spoke 17' extends through the connecting member 10, the spoke fastener 18' of the spoke 17' abuts against an inner wall surface of the connecting member 10, rather than the spoke mounting wall 13. Therefore, the tension of the spoke 17' that extends through the connecting member 10 differs from that of the other spokes 17 (see FIG. 2) which do not extend through the connecting member 10. Thus, when the wheel rim 11 is subjected to impact, the end portions of the metal strip are still liable to release from one another even if the connecting member 10 has been made longer.

SUMMARY OF THE INVENTION

The main object of the present invention is to provide a bicycle wheel rim which permits the use of a shorter connecting member without reducing the bonding strength, and which has two brake pad contacting surfaces that are free of weld flash.

Accordingly, the bicycle wheel rim of this invention includes an annular frame, a connecting member and a weld connection. The annular frame is formed from a metal strip with opposite end portions. The annular frame has a central axis, and includes spaced left and right annular tire retaining walls adapted for retaining a bicycle tire therebetween. Each of the tire retaining walls has an inner edge proximate to the central axis, and a brake pad contacting surface opposite to the other one of the tire retaining walls. The annular frame further includes an annular inner spoke mounting wall interconnecting the inner edges of the tire retaining walls, and an annular outer connecting wall which is disposed around the spoke mounting wall and which interconnects the tire retaining walls. The tire retaining walls, the spoke mounting wall and the outer connecting wall cooperatively confine an annular channel. Each of the left and right annular tire retaining walls, the spoke mounting wall and the outer connecting wall has two confronting end faces that are disposed respectively at the end portions of the metal strip and that are in close contact with each other. The connecting member is fitted in the channel, and extends into the end portions of the metal strip. The weld connection is provided on the annular frame to strengthen connection between end portions of the metal strip. The brake pad contacting surfaces of the tire retaining walls are free of any weld flash.

In one embodiment, the weld connection is provided solely on the confronting end faces of at least one of the spoke mounting wall and the outer connecting wall to bond together the end portions of the metal strip.

In another embodiment, the weld connection bonds together the end portions of the metal strip and the connecting member.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 4:
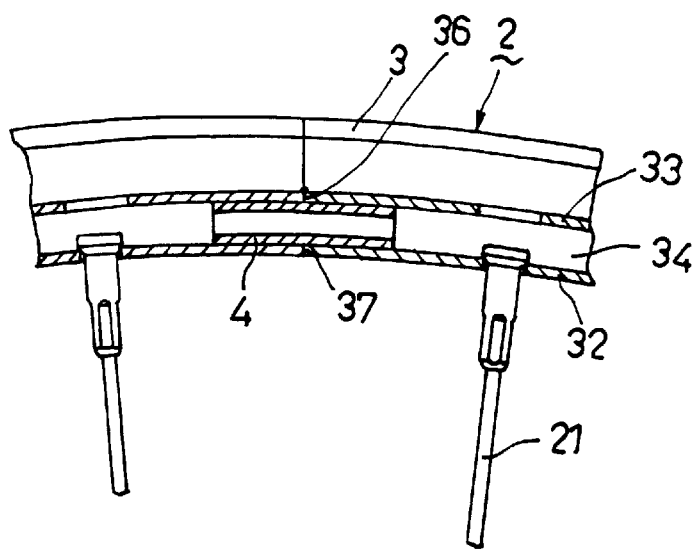
FIG. 4 is a fragmentary cross-sectional view of a first preferred embodiment of the bicycle wheel rim according to the present invention.
Figure 5:
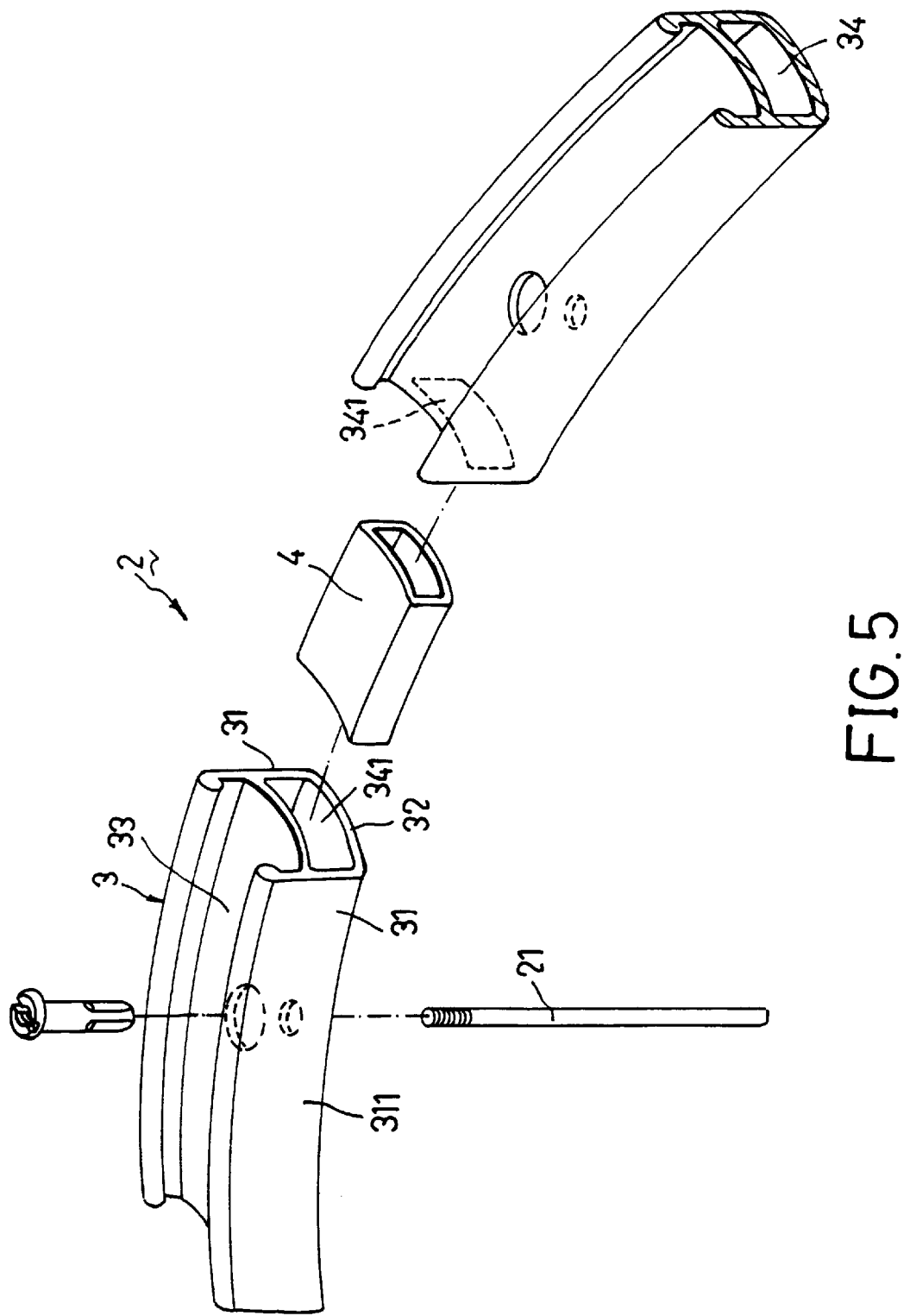
FIG. 5 is a fragmentary exploded perspective view of the bicycle wheel rim of the first preferred embodiment.

Referring to FIGS. 4 and 5, the bicycle wheel rim 2 of the first preferred embodiment of the present invention is adapted for mounting a plurality of spokes 21 thereon, and includes an annular frame 3 formed from a metal strip with two opposite end portions, and a connecting member 4 for connecting the end portions of the metal strip.

The annular frame 3 includes spaced annular left and right tire retaining walls 31 adapted for retaining a bicycle tire (not shown) therebetween, an annular inner spoke mounting wall 32, and an annular outer connecting wall 33. Each of the left and right tire retaining walls 31 has an inner edge proximate to a central axis of the annular frame 3, and a brake pad contacting surface 311 which is opposite to the other one of the tire retaining walls 31. The inner spoke mounting wall 32 interconnects the inner edges of the tire retaining walls 31. The outer connecting wall 33 is disposed around the inner spoke mounting wall 32, and interconnects the left and right tire retaining walls 31. The left and right tire retaining walls 31, the inner spoke mounting wall 32 and the outer connecting wall 33 cooperatively confine an annular channel 34 with two open ends 341 formed respectively in the opposite end portions of the metal strip. Each of the left and right tire retaining walls 31, the spoke mounting wall 32, and the connecting wall 33 has two confronting end faces that are disposed respectively at the end portions of the metal strip and that are in close contact with each other.

The connecting member 4 is a hollow body with an outer periphery that has a cross-section corresponding to that of the annular channel 34. The connecting member 4 is fitted tightly in the annular channel 34 via the open ends 341.

Figure 1:
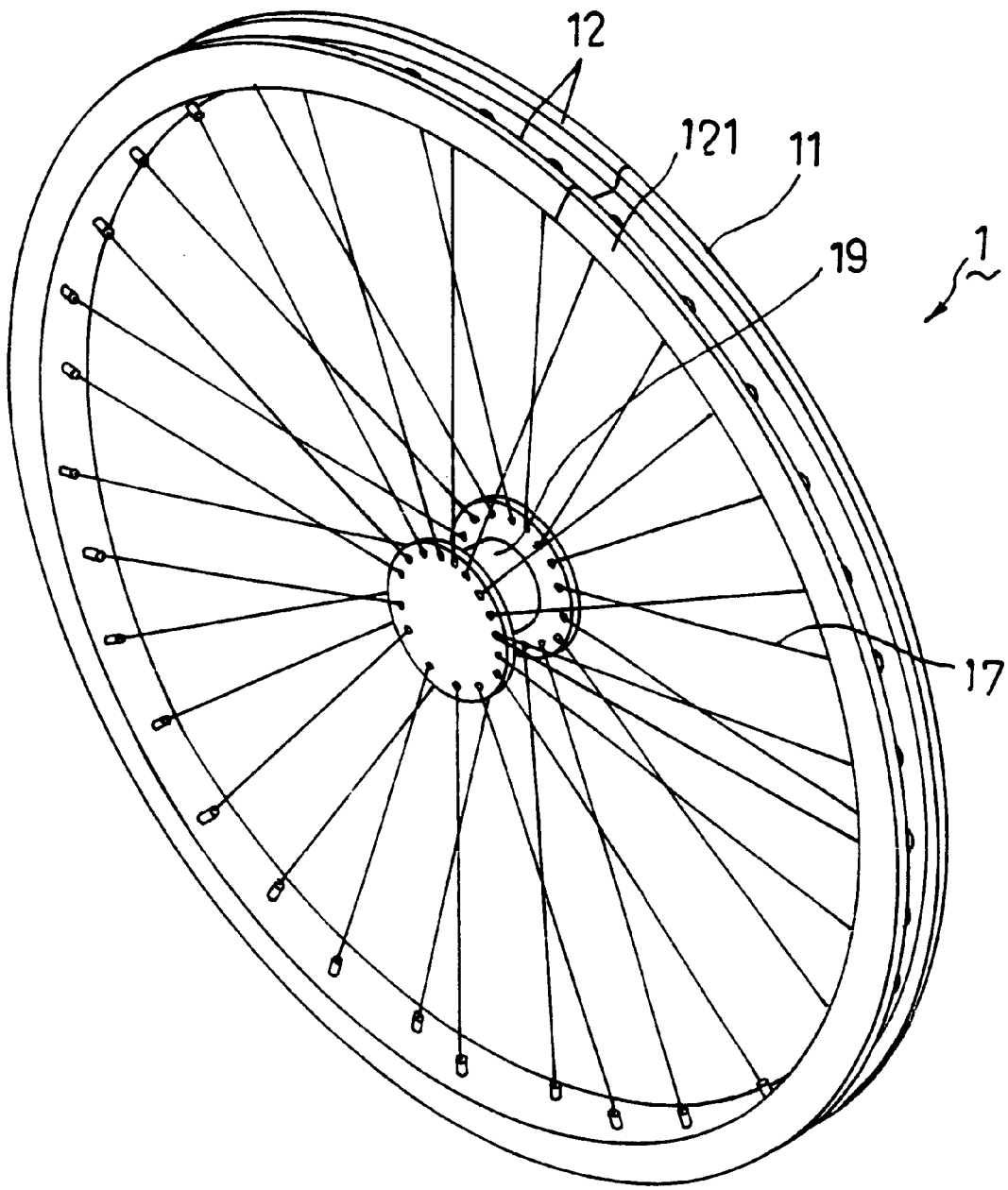
FIG. 1 is a perspective view of a conventional bicycle wheel rim.
Figure 2:
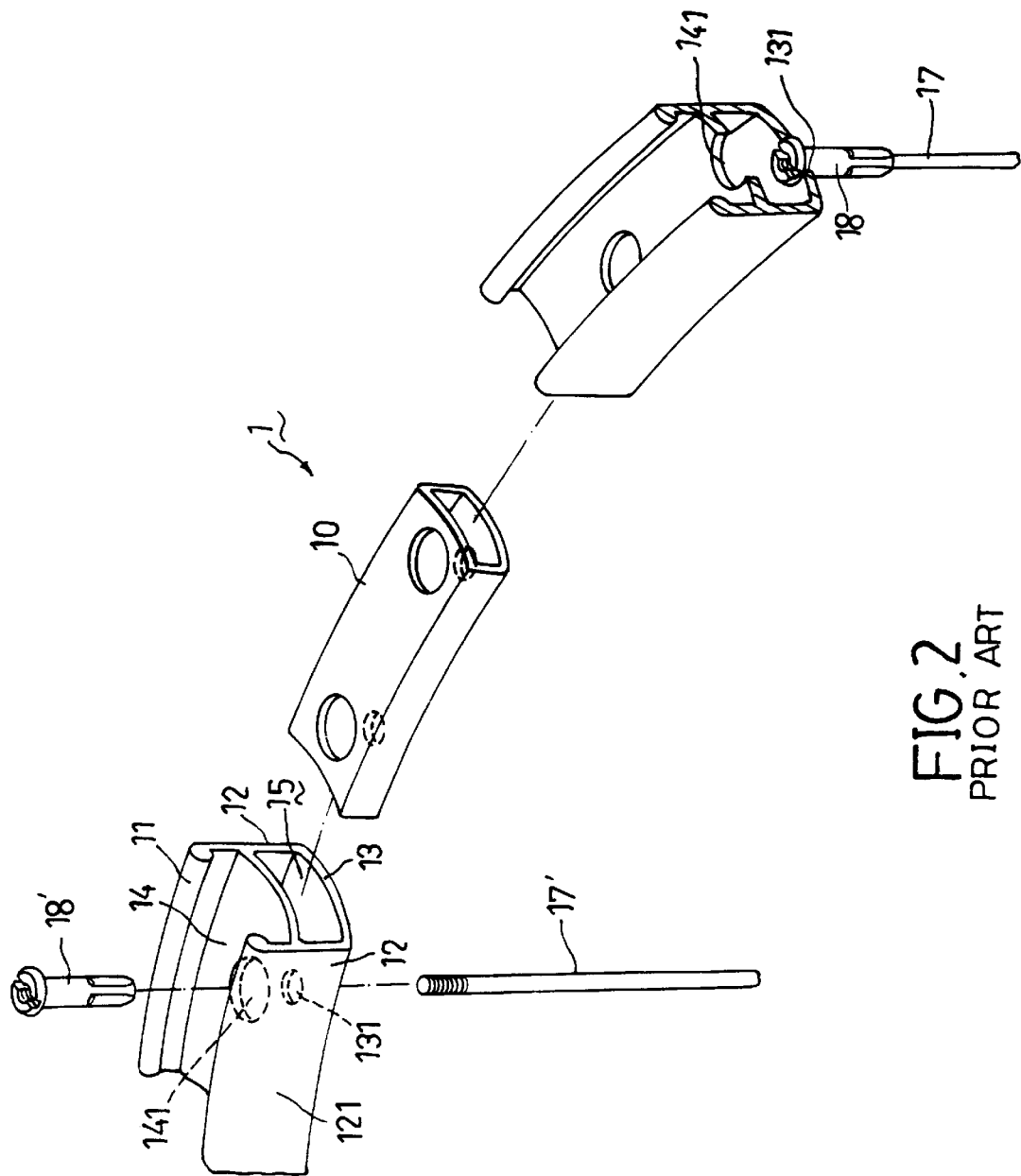
FIG. 2 is a fragmentary exploded perspective view of the conventional bicycle wheel rim.
Figure 3:
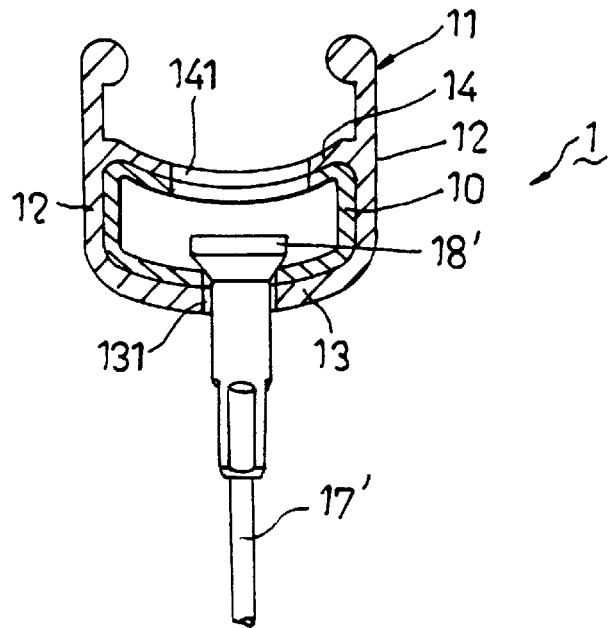
FIG. 3 is a fragmentary cross-sectional view of the conventional bicycle wheel rim.
Figure 6:
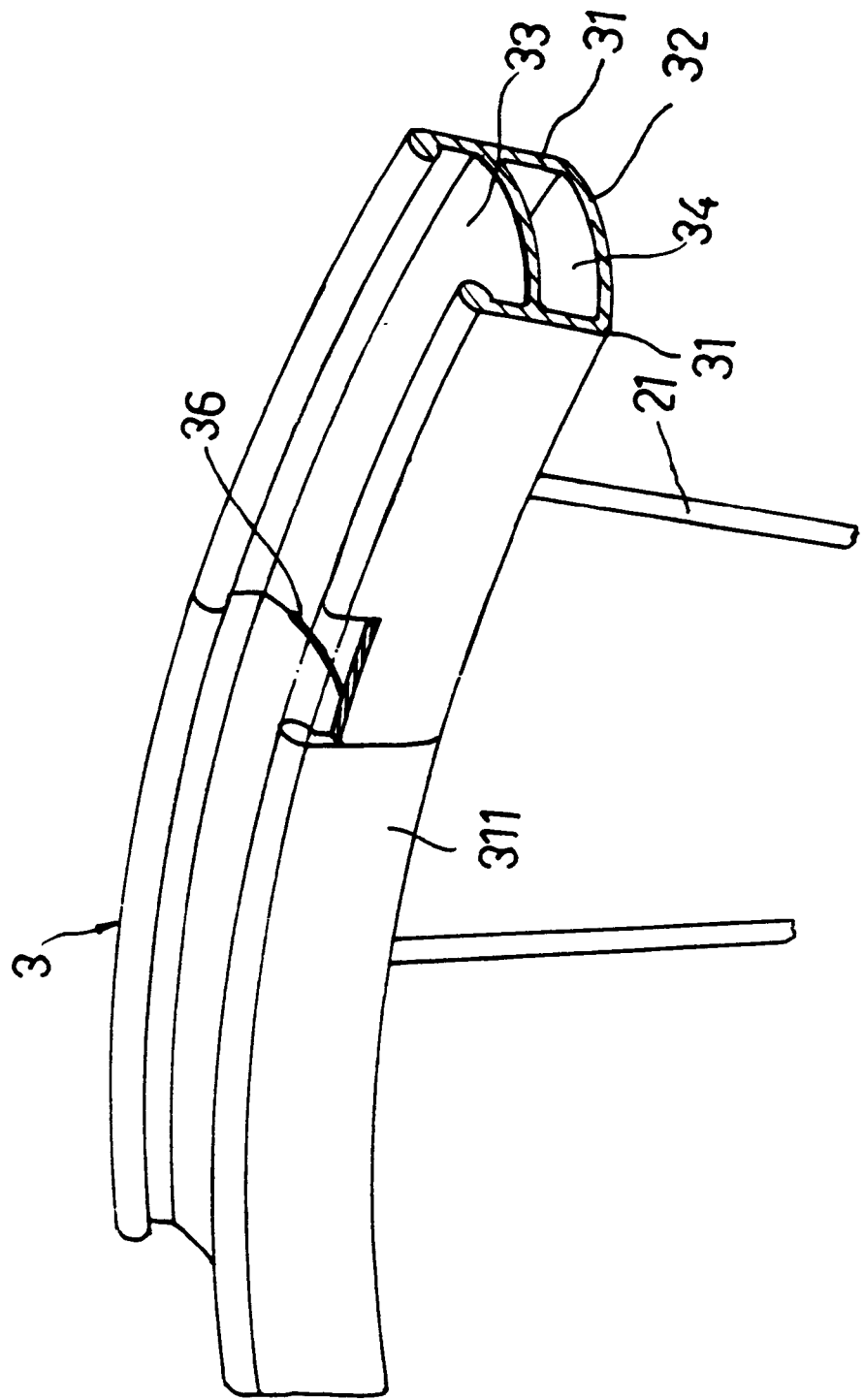
FIG. 6 is a partly sectioned, fragmentary perspective view of the bicycle wheel rim of the first preferred embodiment.

Referring to FIGS. 4 and 6, the bicycle wheel rim of the present embodiment further includes a first weld connection 36 and a second weld connection 37 which are formed from aluminum alloy by inert gas tungsten-arc welding. The first weld connection 36 is provided on the confronting end faces of the outer connecting wall 33, while the second weld connection 37 is provided on the confronting end faces of the inner spoke mounting wall 32. The first and second weld connections 36, 37 do not extend to the brake pad contacting surfaces 311 of the left and right tire retaining walls 31, and thus, the brake pad contacting surfaces 311 are free of any weld flash. With the provision of the first and second weld connections 36, 37, the connection between the end portions of the metal strip is strengthened. The connecting member 4 can thus be designed to have a shorter length, e.g. shorter than the distance between an adjacent pair of spoke mounting holes for mounting the spokes 21, thereby obviating the problem of non-uniform spoke tension in conventional bicycle wheel rims due to extension of one or two of the spokes through the connecting member. The results of an experiment indicate that the strength of connection between the end portions of the metal strip has been raised by as much as 40% as compared to the conventional bicycle wheel rim shown in FIGS. 2 and 3.

Although the preferred embodiment shown in FIG. 4 includes first and second weld connections 36, 37, the bicycle wheel rim of the present invention may include only the first weld connection 36 which is provided on the confronting end faces of the outer connecting wall 33.

Figure 7:
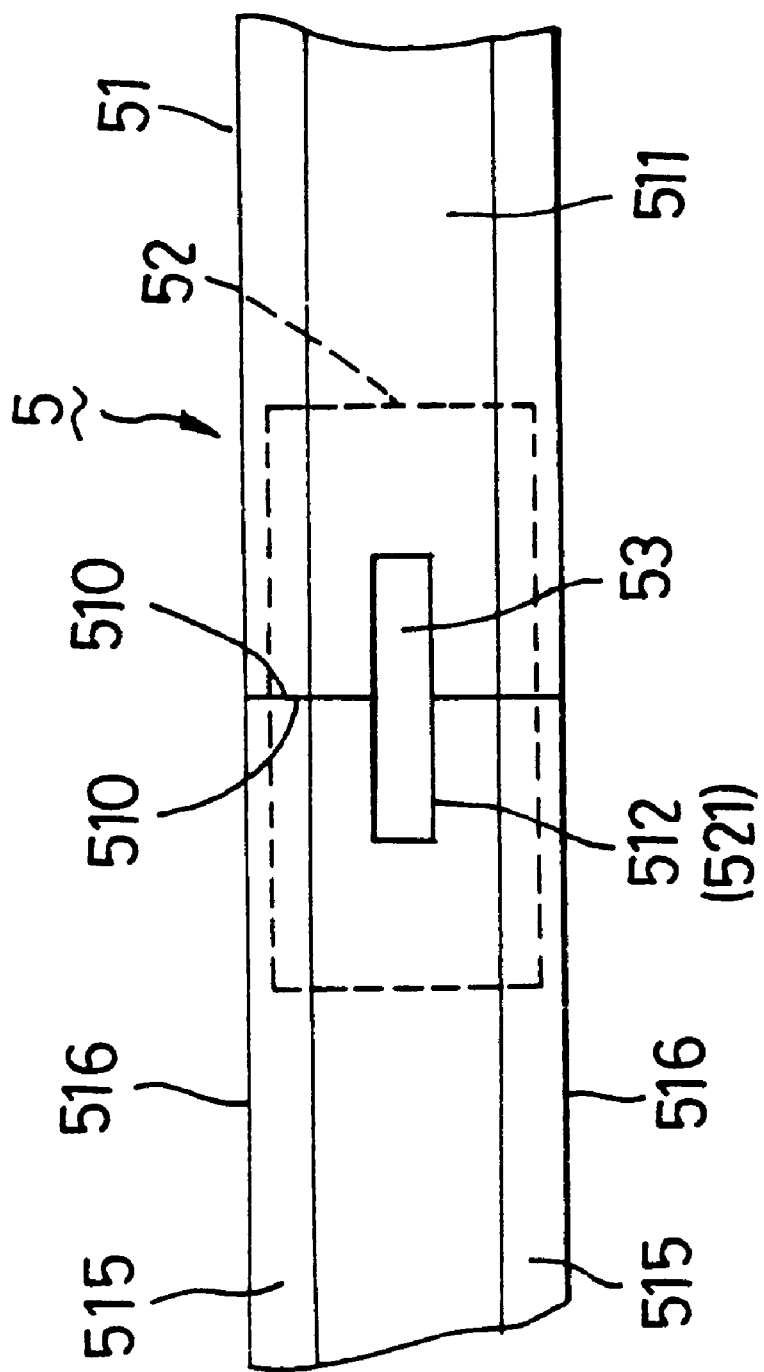
FIG. 7 is a fragmentary schematic view of a second preferred embodiment of the bicycle wheel rim of the present invention.
Figure 8:
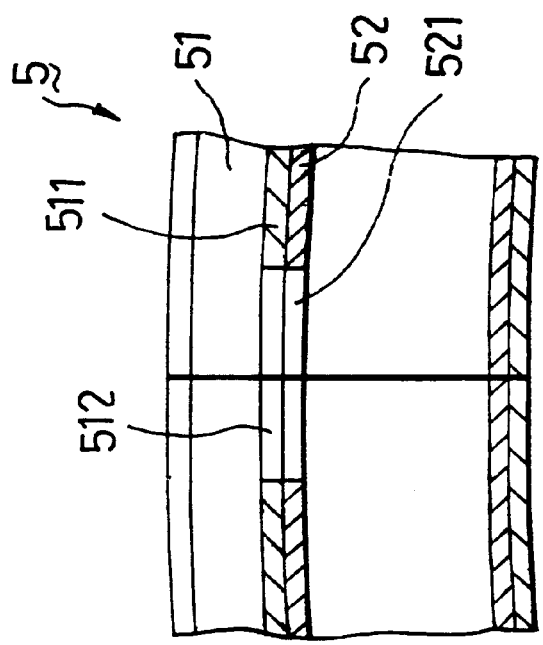
FIG. 8 is a fragmentary cross-sectional view of the bicycle wheel rim of the second preferred embodiment before the provision of a weld connection.

Referring to FIGS. 7 and 8, the bicycle wheel rim 5 of the second preferred embodiment according to the present invention is shown to also include an annular frame 51 formed from a metal strip with two opposite end portions and having a structure similar to that of the annular frame 3 shown in FIG. 5, and a connecting member 52 fitted in an annular channel in the annular frame 51 and extending into the end portions of the metal strip.

The annular frame 51 has spaced annular tire retaining walls 515 with opposite brake pad contacting surfaces 516, an outer connecting wall 511 formed with an elongated first slot 512, and an inner spoke mounting wall. The connecting member 52 has an outer wall which is formed with an elongated second slot 521 that is registered with the first slot 512. The first and second slots 512, 521 are formed by milling. As shown, the first slot 512 is defined by two notches formed respectively in the confronting end faces 510 of the outer connecting wall 511 of the metal strip.

Figure 9:
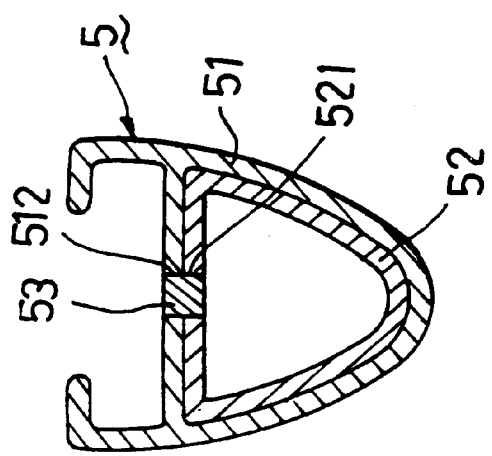
FIG. 9 is another cross-sectional view of the bicycle wheel rim of the second preferred embodiment after the weld connection is provided on an annular frame thereof.

Referring to FIGS. 7 and 9, a weld connection 53 formed from a weld material is fused in the registered first and second slots 512, 521 by inert gas tungsten-arc welding. Since the first slot 512 extends to the opposite end portions of the metal strip, the weld connection 53 can bond together the end portions of the metal strip and the connecting member 52.

Figure 10:
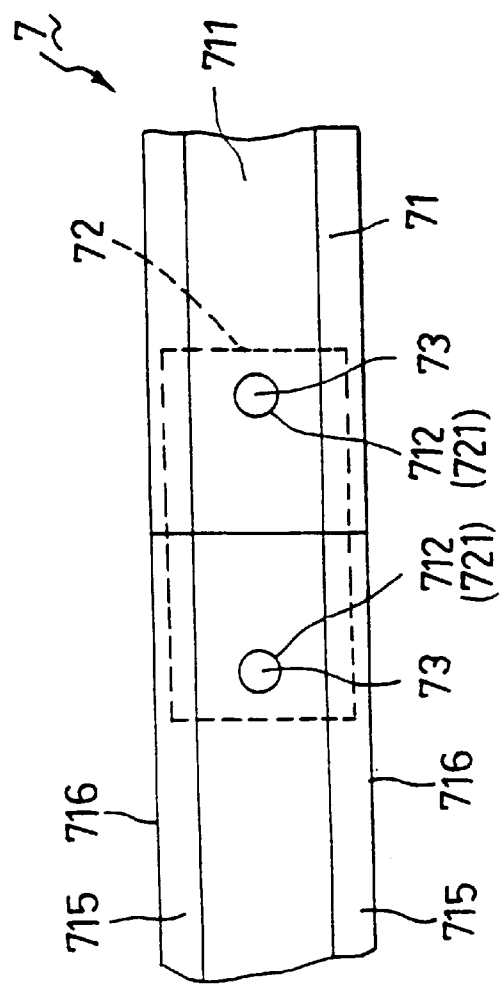
FIG. 10 is a fragmentary schematic view of a third preferred embodiment of the bicycle wheel rim of the present invention.

Referring to FIG. 10, the bicycle wheel rim 7 of the third preferred embodiment according to the present invention is shown to also include an annular frame 71 which is formed from a metal strip with two opposite end portions and which includes spaced left and right tire retaining walls 715 with opposite brake pad contacting surfaces 716, an inner spoke mounting wall and an outer connecting wall 711, similar to the annular frame 3 shown in FIG. 5, and a connecting member 72 that is fitted in an annular channel in the annular frame 71 and that extends into the opposite end portions of the metal strip. The outer connecting wall 711 is formed with two first slots 712 which are respectively formed in the opposite end portions of the metal strip. The connecting member 72 is formed with two second slots 721 that are registered respectively with the first slots 712. A weld connection 73 formed from a weld material is fused in each registered pair of the first and second slots 712, 721 by inert gas tungsten-arc welding to bond together the end portions of the metal strip and the connecting member 72.

Figure 11:
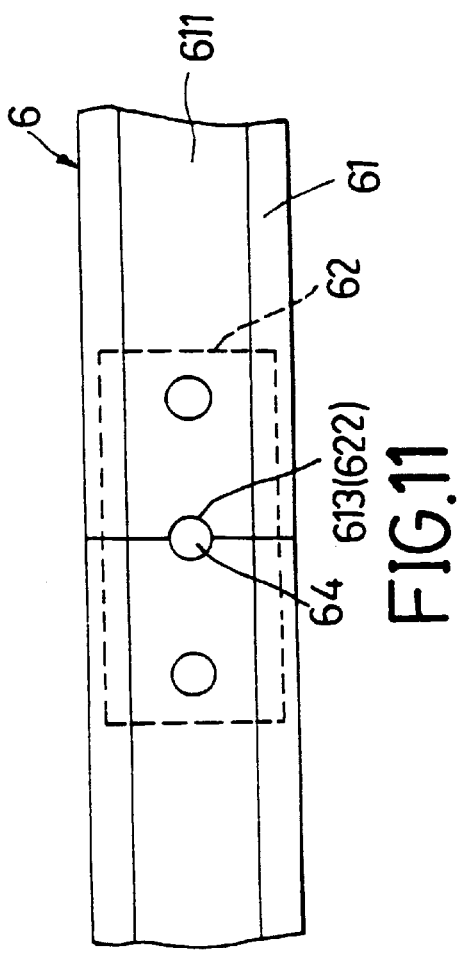
FIG. 11 is a fragmentary schematic view of a fourth preferred embodiment of the bicycle wheel rim of the present invention.

Referring to FIG. 11, the bicycle wheel rim 6 of the fourth preferred embodiment according to the present invention is shown to have a structure similar to the bicycle wheel rim 7 of FIG. 10. Unlike the bicycle wheel rim 7 shown in FIG. 10, the annular frame 61 of the bicycle wheel rim 6 is further formed with a third slot 613 in the outer connecting wall 611, and the connecting member 62 is further formed with a fourth slot 622 that is registered with the third slot 613. Like the first slot 512 shown in FIGS. 8 and 9, the third slot 613 in FIG. 11 extends to two opposite end portions of the metal strip. A weld connection 64 formed from a welding material is fused in the registered third and fourth slots 613, 622 to further strengthen the connection between the end portions of the metal strip.

Accordingly, by providing a weld connection 36 on the confronting end faces of the outer connecting walls 33 of the annular frame 3 as shown in FIGS. 4 and 5, or a weld connection 53, 73, 64 fused in the registered slots formed in the end portions of the metal strip and in the connecting member as shown in FIGS. 7 to 11, the connection between the opposite end portions of the metal strip can be strengthened. Therefore, the length of the connecting member can be shorter than the distance between an adjacent pair of the inner (or outer) spoke mounting holes so as to prevent the occurrence of non-uniform spoke tension. Moreover, the brake pad contacting surfaces of the bicycle wheel rim can be made free of any weld flash without the need for a polishing operation and without the drawback of reduced frame strength.

With this invention thus explained, it is apparent that numerous modifications and variations can be made without departing from the scope and spirit of this invention. It is therefore intended that this invention be limited only as indicated in the appended claims.

I claim:

1. A bicycle wheel rim comprising:
    an annular frame formed from a metal strip with opposite end portions, said annular frame having a central axis and including
        spaced left and right annular tire retaining walls adapted for retaining a bicycle tire therebetween, each of said tire retaining walls having an inner edge proximate to the central axis, and a brake pad contacting surface opposite to the other one of said tire retaining walls,
        an annular inner spoke mounting wall interconnecting said inner edges of said tire retaining walls, and
        an annular outer connecting wall disposed around said spoke nounting wall and interconnecting said tire retaining walls,
    said tire retaining walls, said spoke mounting wall and said outer connecting wall cooperatively confining an annular channel,
    each of said left and right annular tire retaining walls, said spoke mounting wall and said outer connecting wall having two confronting end faces that are disposed respectively at said end portions of said metal strip and that are in close contact with each other;
    a connecting member fitted in said channel and extending into said end portions of said metal strip; and
    a weld connection provided solely on said confronting end faces of at least one of said spoke mounting wall and said outer connecting wall to bond together said end portions of said metal strip, said brake pad contacting surfaces of said tire retaining walls being free of any weld flash.

2. The bicycle wheel rim as claimed in claim 1, wherein said weld connection is formed by gas tungsten-arc welding.

3. A bicycle wheel rim comprising:
    an annular frame formed from a metal strip with opposite end portions, said annular frame having a central axis and including
        spaced annular left and right tire retaining walls adapted for retaining a bicycle tire therebetween, each of said tire retaining walls having an inner edge proximate to the central axis, and a brake pad contacting surface opposite to the other one of said tire retaining walls,
        an annular inner spoke mounting wall interconnecting said inner edges of said tire retaining walls, and
        an annular outer connecting wall disposed around said spoke mounting wall and interconnecting said tire retaining walls,
    said tire retaining walls, said spoke mounting wall and said outer connecting wall cooperatively confining an annular channel,
    each of said left and right annular tire retaining walls, said spoke mounting wall and said outer connecting wall having two confronting end faces that are disposed respectively at said end portions of said metal strip and that are in close contact with each other;
    a connecting member fitted in said channel and extending into said end portions of said metal strip; and
    a weld connection for bonding together said end portions of said metal strip and said connecting member, said brake pad contacting surfaces of said tire retaining walls being free of any weld flash.

4. The bicycle wheel rim as claimed in claim 3, wherein said outer connecting wall is formed with a first slot, said connecting member being formed with a second slot that is registered with said first slot, said weld connection including a weld material fused in said first and second slots to bond together said metal strip and said connecting member.

5. The bicycle wheel rim as claimed in claim 4, wherein said weld material of said weld connection is fused in said first and second slots by gas tungsten-arc welding.

6. The bicycle wheel rim as claimed in claim 4, wherein said first slot extends to said opposite end portions of said metal strip.

7. The bicycle wheel rim as claimed in claim 3, wherein said outer connecting wall has two first slots formed respectively in said opposite end portions of said metal strip, said connecting member being formed with two second slots that are registered respectively with said first slots, said weld connection including a weld material fused in each registered pair of said first and second slots to bond together said end portions of said metal strip and said connecting member.

8. The bicycle wheel rim as claimed in claim 7, wherein said weld material of said weld connection is fused in said first and second slots by gas tungsten-arc welding.

* * * * *